(12) United States Patent
Heyworth

(10) Patent No.: US 7,303,331 B2
(45) Date of Patent: Dec. 4, 2007

(54) TEMPERATURE MEASURING SYSTEM

(75) Inventor: Harold Heyworth, Loughborough (GB)

(73) Assignee: Rolls-Royce plc, London (GB)

( * ) Notice: Subject to any disclaimer, the term of this patent is extended or adjusted under 35 U.S.C. 154(b) by 90 days.

(21) Appl. No.: 11/176,198

(22) Filed: Jul. 8, 2005

(65) Prior Publication Data

US 2006/0034345 A1    Feb. 16, 2006

(30) Foreign Application Priority Data

Aug. 13, 2004    (GB) .................................. 0418082.4

(51) Int. Cl.
  *G01K 1/08*    (2006.01)
  *G01J 5/00*    (2006.01)
(52) U.S. Cl. ........................ 374/141; 374/121; 374/130
(58) Field of Classification Search ................ 374/141, 374/121

See application file for complete search history.

(56) References Cited

U.S. PATENT DOCUMENTS

| | | | |
|---|---|---|---|
| 4,525,066 A | 6/1985 | Guillaume et al. | |
| 5,209,570 A * | 5/1993 | Neuhaus | 374/131 |
| 5,381,229 A * | 1/1995 | Murphy et al. | 356/477 |
| 6,341,890 B1 | 1/2002 | Vally et al. | |
| 6,585,409 B2 * | 7/2003 | Schmidt et al. | 374/121 |
| 7,087,902 B2 * | 8/2006 | Wang et al. | 250/341.1 |
| 2001/0005393 A1 * | 6/2001 | Schmidt et al. | 374/130 |
| 2001/0017879 A1 * | 8/2001 | Kienitz et al. | 374/121 |
| 2005/0062958 A1 * | 3/2005 | Namiki | 356/125 |
| 2005/0236585 A1 * | 10/2005 | Miyake | 250/492.2 |

FOREIGN PATENT DOCUMENTS

| | | |
|---|---|---|
| EP | 0 650 039 A1 | 4/1995 |
| GB | 2 232 244 A | 12/1990 |
| JP | 7-63616 A | 3/1995 |
| JP | 2001-50818 A | 2/2001 |

* cited by examiner

*Primary Examiner*—Diego Gutierrez
*Assistant Examiner*—Megann E Vaughn
(74) *Attorney, Agent, or Firm*—Oliff & Berridge, PLC

(57) ABSTRACT

A temperature measuring system, comprising an imaging device for focusing radiation towards a radiation detector, wherein the imaging device is a diffractive optical device.

12 Claims, 4 Drawing Sheets

TEMPERATURE MEASURING SYSTEM

BACKGROUND OF THE INVENTION

1. Field of the Invention

Embodiments of the present invention relate to a temperature measuring system. In particular, they relate to a temperature measuring system for use within a gas turbine engine.

2. Description of the Related Art

A gas turbine engine is a heat engine using air as a working fluid to provide thrust. Air at atmospheric pressure enters the engine at an air intake and is compressed by the compressor blades. Compressed air then enters a combustion chamber where heat is added to the air by introducing and burning fuel at constant pressure, thereby increasing the volume of the air considerably. Gases resulting from combustion expand through the turbine, driving the turbine blades, and subsequently flow out of the exhaust.

The amount of fuel added to the air in the combustion chamber depends on the temperature rise required. The maximum temperature is, however, limited by the materials from which the nozzles and turbine blades are made.

The nozzles and turbine blades are built using materials that are able to resist heat and are not susceptible to thermal shock at high temperatures, such as nickel based alloys. Despite this, for a particular blade material there is an acceptable safe life and a maximum permissible turbine entry temperature. It therefore follows that it would be useful to have an accurate estimate of the temperature of the turbine blades, in order to ensure that the maximum turbine entry temperature is not being exceeded.

Optical pyrometers are often used in industrial applications to estimate temperatures, particularly when it is difficult to situate a temperature measuring device close to the object being measured. An optical pyrometer provides an estimate of the temperature of an object by focusing the radiation emanating from the object using optical lenses towards a radiation detector. The temperature of the object can then be estimated from the measured intensity of the light using, for example, the well-known Planck radiation law.

Optical pyrometers can provide a reasonably accurate estimate of the temperature in many situations. However, their use in a gas turbine engine can be problematic because the temperatures reached within the engine are very high. The lenses used often have a different thermal expansion coefficient to their housing, which has to be accounted for. The filler material used to connect the lenses to their housing may also susceptible to degradation at high temperatures. Furthermore, the optical lenses can become covered with soot and dirt while the engine is in operation. These factors all have a bearing on the accuracy of the temperature estimate provided by the pyrometer and can mean that it is less accurate than it would otherwise be.

BRIEF SUMMARY OF THE INVENTION

According to one aspect of the present invention, there is provided a temperature measuring system comprising an imaging device focusing radiation towards a radiation detector, characterised in that the imaging device is a diffractive optical device.

The diffractive optical device may comprise a zone plate. The zone plate may have a single zone (a pinhole), alternatively, the zone plate may have multiple-zones. A multiple-zone zone plate will diffract more of the incident light towards its focal points than a pinhole. The intensity of light reaching the focal points will be higher and therefore the temperature estimate is likely to be more accurate.

The multiple-zone zone plate may comprise a series of concentric rings of different radii. The area of each ring may be the same. Alternatively, the multiple-zone zone plate may comprise a series of parallel strips.

The temperature measuring system may further comprise means for providing an airflow through the diffractive optical device. An airflow through the diffractive optical device has the advantageous effect of cleaning the device while the device is in use.

The temperature measuring system may further comprise support means for supporting the diffractive optical device. The support means may be made from the same material as the diffractive optical device. If they are made from the same material, both the support means and the diffractive optical device may advantageously have the same thermal expansion coefficient. They may therefore expand and contract at the same rate.

The temperature measuring system may further comprise at least one fibre optic or other optical relaying system for directing radiation towards the radiation detector. This is advantageous as the operation of the radiation detector may be adversely affected by the high temperatures within the gas turbine engine. By using a fibre optic, the radiation detector can be situated away from a region of high temperature.

The diffractive optical device may be coated with a self-cleaning material. An advantage of this embodiment is that the device can clean itself while the gas turbine engine is in operation. The diffractive optical device may be coated at least partially with platinum, which is one example of a self-cleaning material.

The temperature measuring system can be used in a variety of applications and may in particular be used to measure the temperature of one or more components of an aerospace engine.

BRIEF DESCRIPTION OF DRAWINGS

For better understanding of the present invention, reference will now be made by way of example only to the accompanying drawings in which.

DETAILED DESCRIPTION OF THE PREFERRED EMBODIMENTS

Figure 1:
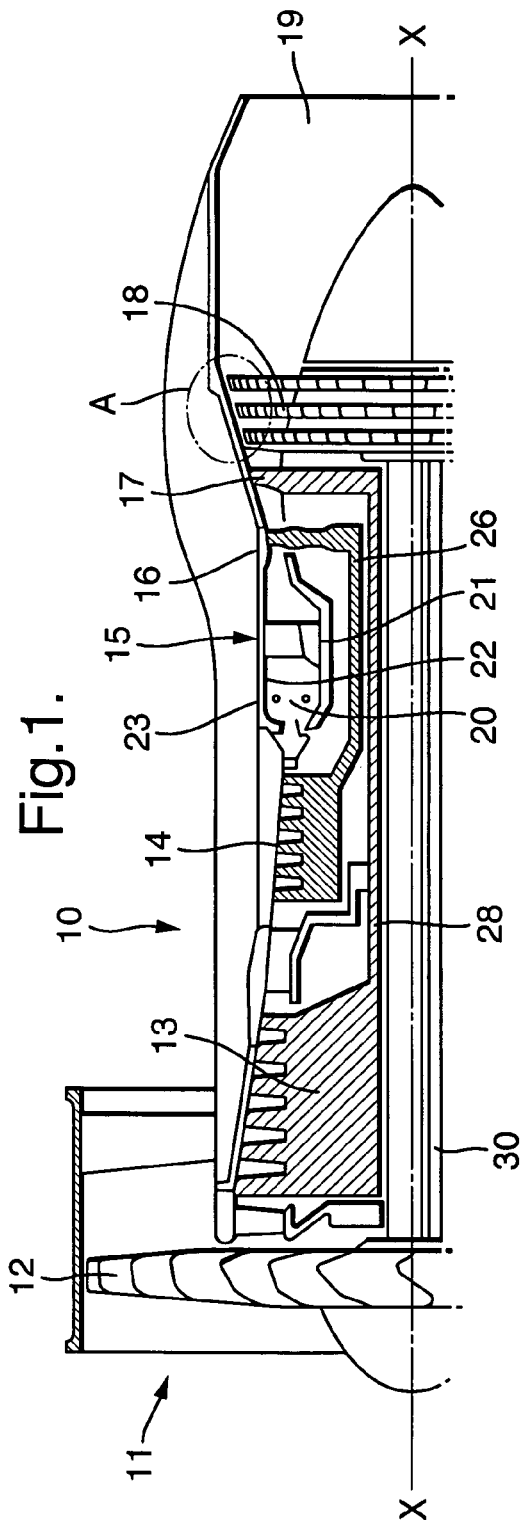
FIG. 1 illustrates a conventional gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbine 16, 17 and 18 respectively drive the high and intermediate pressure compressors 14 and 13, and the fan 12 by suitable interconnecting shafts.

A temperature measuring system 40 used for measuring the temperature of the turbine blades 16, 17 and 18 would typically be located within the area marked A, although conceivably it could be located elsewhere.

Figure 2:
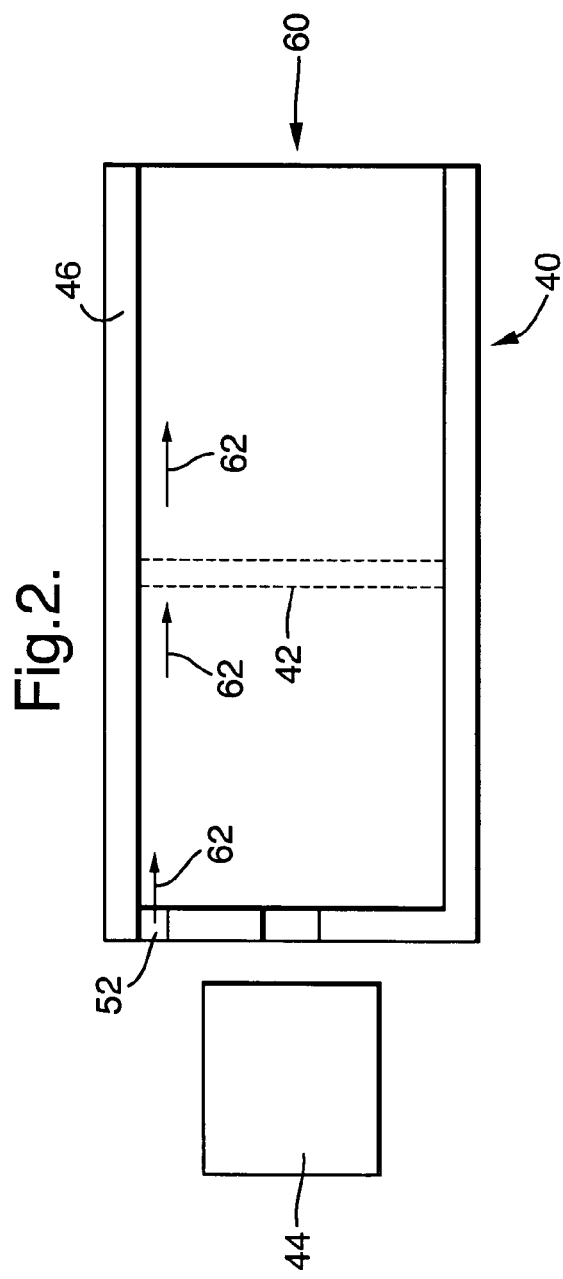
FIG. 2 illustrates a temperature measuring system featuring a diffractive optical device.

FIG. 2 illustrates a suitable temperature measuring system 40, comprising an imaging device 42 for focusing radiation towards a radiation detector 44. The imaging device is a diffractive optical device 42.

Light emanates from the target object in the general direction of arrow 60. The diffractive optical device 42 is configured in such a way that its primary focal length falls at the surface of the radiation detector 44. The radiation detector 44 could alternatively be placed at the third-order focal point, or even the fifth-order focal point. The focal points of the diffractive optical device 42 are described in further detail later. An estimate of the temperature is made based upon the intensity of light measured at the radiation detector 44, using methods known in the art.

The diffractive optical device 42 is shown connected to a support 46. The support 46 also comprises one or more apertures 52 for providing an airflow through the diffractive optical device 42. The general direction of the airflow is indicated by the arrows 62. During the operation of the gas turbine engine 10, dirt and/or soot particles may become lodged in the diffractive optical device 42. This may reduce the amount of light that can travel through the device 42 and consequently the temperature estimates obtained may be less accurate. The airflow through the engine 10 indicated by arrows 62 dislodges dirt or soot particles that may obstruct the passage of radiation through the diffractive optical device 42, helping the temperature measuring system 40 to operate more effectively.

Figure 3A:
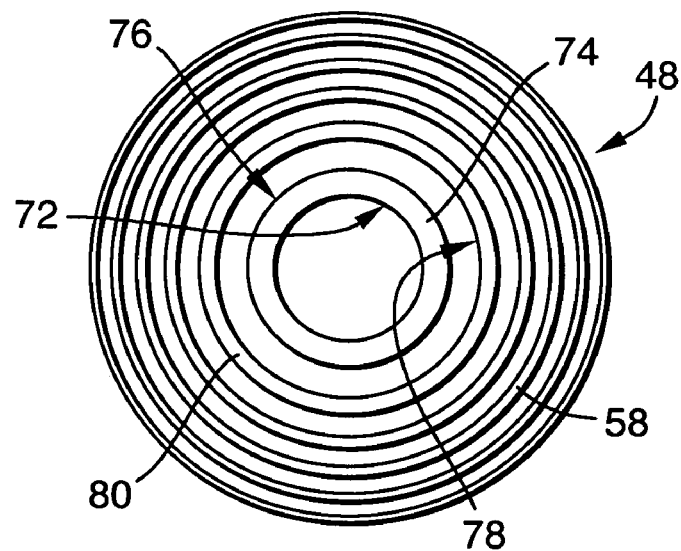
FIG. 3A illustrates a multiple-zone zone plate comprising a series of concentric rings.

FIG. 3A illustrates a multiple-zone zone plate 48 comprising a series of concentric rings. By approximating that the light incident upon the zone plate takes the form of a plane wave, it can be shown that:

$$f_1 = R_m^2 / m\lambda \quad (1)$$

where $f_1$ is the primary focal length of the zone plate 48, m is the order of the ring, $R_m^2$ is the radius of the $m^{th}$ ring and is the wavelength of the incident light.

A multiple-zone zone plate 48 can therefore be configured by setting the primary focal length as required and calculating $R_m^2$ using equation (1) for successive integer values of m. $R_1$ is the distance from the centre of the zone plate 48 to the first edge 72 of the first ring 74. $R_2$ is the distance from the centre of the zone plate 48 to the second edge 76 of the first ring 74. The thickness of the first ring 74 is therefore $R_2 - R_1$. $R_3$ is the distance from the centre of the zone plate 48 to the first edge 78 of the second ring 80. It follows from equation (1) that the area of each concentric ring of the zone plate 48 is the same.

When light is instant upon zone plate 48, the primary focal length $f_1$ corresponds to a principal maximum in the irradiance distribution. The optical axis for the zone plate illustrated in FIG. 3a is perpendicular to the plane of the page and through the centre of the zone plate 48. If we were to move a sensor along the optical axis from the primary focal point towards the zone plate 48, a series of very small irradiance maxima and minima would be measured until a pronounced irradiance peak is found at a distance $f_1/3$ from the zone plate. This is known as the third-order focal point. Additional focal points will be found at $f_1/5$, $f_1/7$ and so forth. It will be apparent that a radiation detector could be placed at any point where there is a pronounced irradiation peak, although temperature measurements will be more accurate if they are based upon the light gathered at the primary focal point. This is because the intensity of the diffracted light is highest at the primary focal point and as a consequence any measurements taken will have a smaller signal to noise ratio than if they were taken at any other point along the optical axis.

Figure 3B:
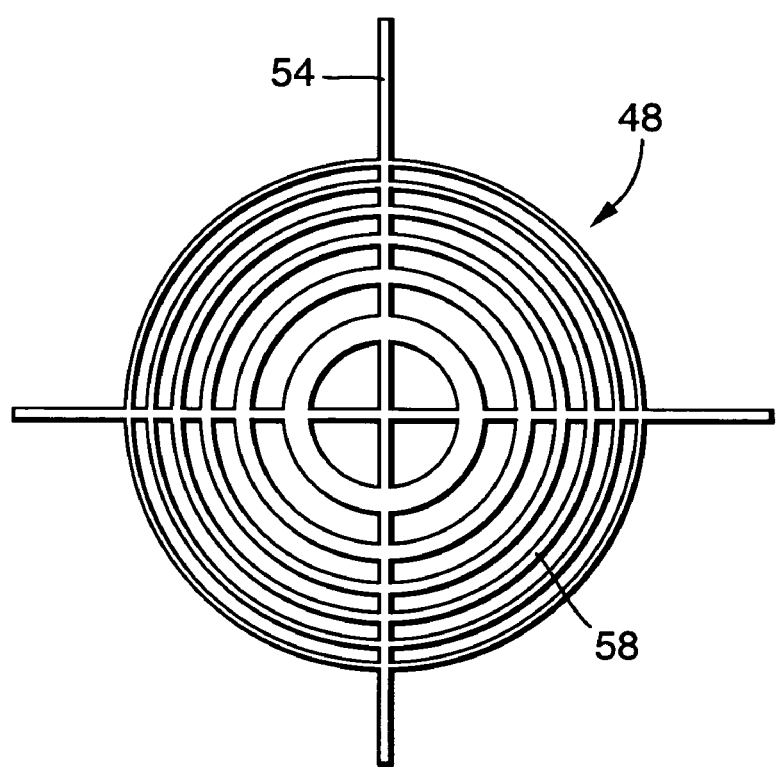
FIG. 3B illustrates a zone plate connected to a support means.

FIG. 3B illustrates a zone plate 48 connected to a crossbar 54. The crossbar 54 is one type of mechanism that can be used to connect the zone plate 48 to the housing 46. The crossbar 54 is typically made from the same material as the zone plate 48 and the housing 46, so that they have the same coefficient of thermal expansion. The zone plate 48 and the crossbar 54 may also be coated with a self cleaning material, such as platinum.

Figure 4:
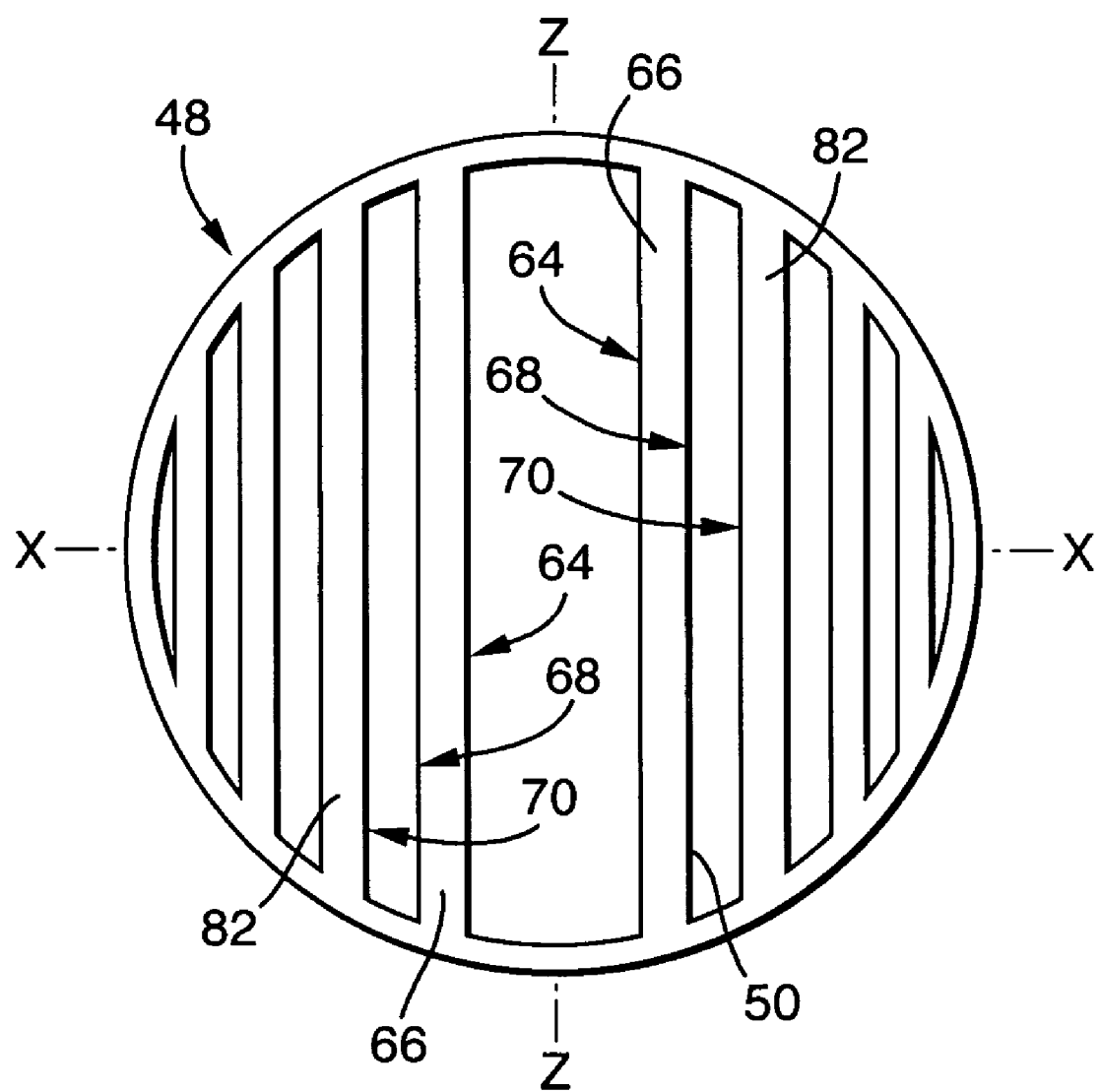
FIG. 4 illustrates a multiple-zone zone plate comprising a series of parallel strips.

FIG. 4 illustrates a zone plate 48 which comprises a series of parallel strips 50. The X-X axis is defined as going horizontally across the centre of the zone plate 48, the Y-Y axis is defined as going perpendicular to the plane of the page, through the centre of the zone plate 48 and the Z-Z axis is defined as going vertically through the centre of the zone plate 48.

A zone plate 48 comprising a series of parallel strips 50 is commonly known as an astigmatic zone plate, as it only has optical power in one optical plane. The astigmatic zone plate illustrated in FIG. 4 only has power in the optical plane defined by the X-X and Y-Y axes. It has no optical power in the plane defined by the Z-Z and Y-Y axes. It is possible to perform the invention with an astigmatic zone plate, as it will act to focus radiation onto the radiation detector 44.

Referring back to equation (1), an astigmatic zone plate can be constructed by breaking $R_m$ into its two perpendicular components, $x_m$ and $z_m$, and letting $z_m \rightarrow 0$, so that $R_m \rightarrow x_m$. $x_m$ is measured from the centre of the zone plate. By setting a value for $f_1$ and, $x_m$ can be calculated for successive values of m, and a multiple-zone astigmatic zone plate can be configured.

$x_1$ is the distance from the centre of the zone plate to the first edge 64 of the first parallel strips 66. $x_2$ is the distance from the centre of the zone plate to the second edge 68 of the first parallel strips 66. The width of the first parallel strips 66 is therefore $x_2 - x_1$. $x_3$ defines the distance from the centre to the first edge 70 second parallel strips 82.

Figure 5:
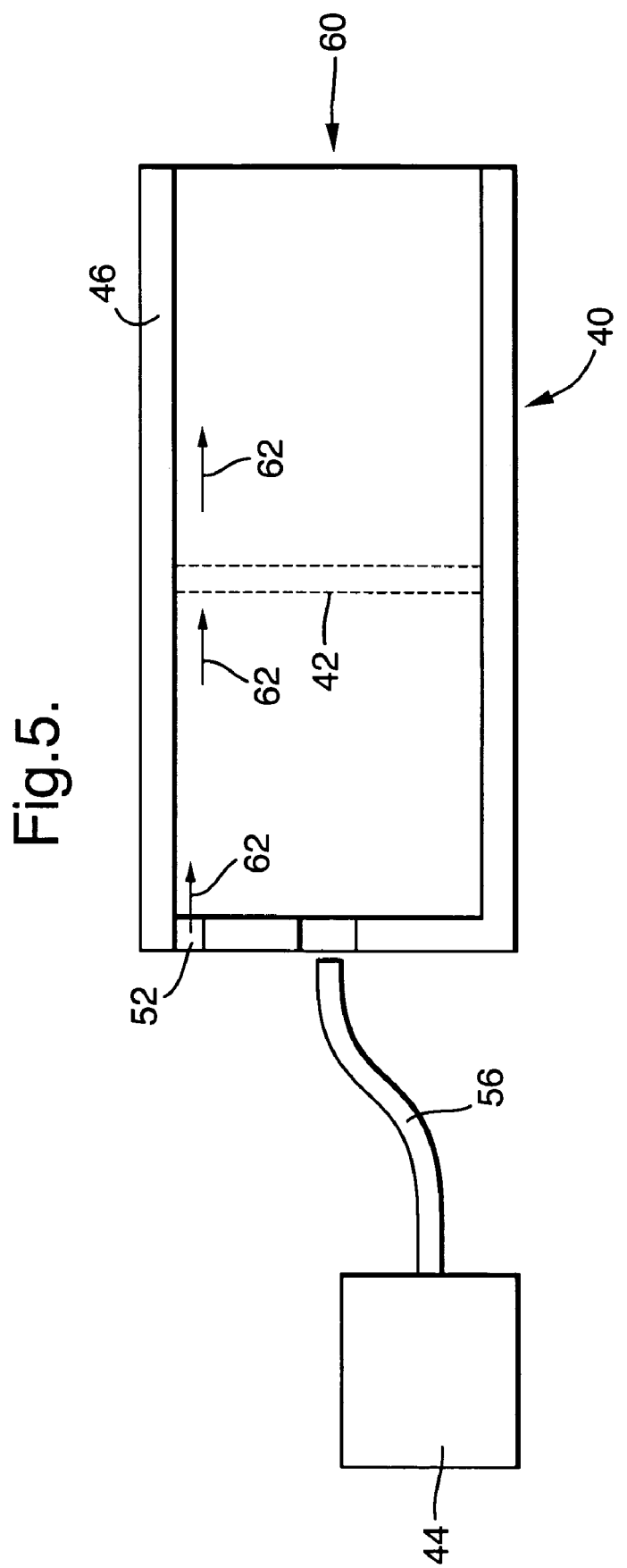
FIG. 5 illustrates a temperature measuring system featuring a diffractive optical device wherein the radiation detector is located remotely.

FIG. 5 illustrates another temperature measuring system 40. In this instance, the light is diffracted by the diffractive optical device 42 onto the tip of an optical fibre 56. The light enters the fibre in such a way that it will be reflected along the optical fibre 56 to the radiation detector 44.

Although embodiments of the present invention have been described in the preceding paragraphs with reference to various examples, it should be appreciated that modifications to the examples given can be made without departing from the scope of the invention as claimed. For example, the diffractive optical device may comprise a zone plate with concentric rings or a zone plate with parallel strips. The diffractive optical device may be connected to the outer housing by means of a crossbar or otherwise. The crossbar or support means may be made of a similar or the same material as the diffractive optical device. The radiation detector may be adjacent to the housing of the diffractive optical device or it may be remotely linked by a fibre optic. The temperature measuring system may be used to estimate the temperature of turbine blades or indeed other parts of a gas turbine engine. The use of the system, however, is not limited to aerospace applications. It could also be used, for example, in a steel mill to monitor metal temperatures.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A temperature measuring system, comprising:
   an imaging device for focusing radiation towards a radiation detector, the imaging device is a diffractive optical device that includes a zone plate, the diffractive optical device is connected to a support, wherein the support includes aperture means for directing an airflow through the diffractive optical device to dislodge dirt or soot particles therefrom, and wherein the radiation detector is used to measure a temperature.

2. A temperature measuring system as claimed in claim 1, wherein the zone plate comprises a series of concentric rings of different radii.

3. A temperature measuring system as claimed in claim 2, wherein the area of each ring is the same.

4. A temperature measuring system as claimed in claim 1, wherein the zone plate comprises a series of parallel strips.

5. A temperature measuring system as claimed in claim 1, further comprising support means for supporting the diffractive optical device.

6. A temperature measuring system as claimed in claim 5, wherein the support means is made from the same material as the diffractive optical device.

7. A temperature measuring system as claimed in claim 1, further comprising at least one fibre optic for directing radiation towards the radiation detector.

8. A temperature measuring system as claimed in claim 1, wherein the diffractive optical device is coated with a self cleaning material.

9. A temperature measuring system as claimed in claim 1, wherein the diffractive optical device is at least partially coated with platinum.

10. An aerospace engine comprising a temperature measuring system as claimed in claim 1.

11. A method for measuring temperature, the method comprising:
    operating a temperature measuring system including an imaging device for focusing radiation towards a radiation detector, the imaging device is a diffractive optical device including a zone plate, the diffractive optical device is connected to a support, wherein the support includes aperture means for directing an airflow through the diffractive optical device;
    directing the airflow through said aperture means and through the diffractive optical device to dislodge dirt or soot particles therefrom; and
    measuring a temperature using the radiation detector.

12. A method for measuring temperature as claimed in claim 11, wherein the system is used to measure the temperature of one or more components of an aerospace engine.

* * * * *